(12) United States Patent
Bear et al.

(10) Patent No.: US 8,548,904 B1
(45) Date of Patent: *Oct. 1, 2013

(54) TRANSACTION RISK ANALYZER

(75) Inventors: Charles Randy Bear, San Antonio, TX (US); Marco Aldo Jimenez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,643

(22) Filed: May 21, 2012

Related U.S. Application Data

(63) Continuation of application No. 11/924,550, filed on Oct. 25, 2007, now Pat. No. 8,185,457.

(51) Int. Cl.
*G06Q 40/00* (2012.01)

(52) U.S. Cl.
USPC .............................................. 705/38; 705/39

(58) Field of Classification Search
CPC ...................................................... G06Q 40/00
USPC ........................................................... 705/35
See application file for complete search history.

(56) References Cited

U.S. PATENT DOCUMENTS

| | | | |
|---|---|---|---|
| 7,249,094 B2 | 7/2007 | Levchin et al. | |
| 7,346,575 B1 | 3/2008 | Ahles et al. | |
| 2003/0135457 A1* | 7/2003 | Stewart et al. | 705/39 |
| 2003/0208684 A1* | 11/2003 | Camacho et al. | 713/186 |
| 2004/0078340 A1 | 4/2004 | Evans | |
| 2004/0148252 A1* | 7/2004 | Fleishman | 705/39 |
| 2006/0064374 A1* | 3/2006 | Helsper et al. | 705/39 |
| 2006/0226216 A1 | 10/2006 | Keithley et al. | |
| 2006/0282660 A1 | 12/2006 | Varghese et al. | |
| 2007/0124238 A1 | 5/2007 | Hogg et al. | |
| 2008/0091590 A1 | 4/2008 | Kremen | |

OTHER PUBLICATIONS

An Oracle White Paper. "Oracle Adaptive Access Manager," Oracle, Sep. 2007, 3 pages.
A Bank of America White Paper. "Combating Fraud on Corporate Checking Account," Bank of America, Apr. 2004, 11 pages.
LexisNexis Media Relations. "LexisNexis Risk & Information Analytics Group Teams With Actimize for a Comprehensive Customer Due Diligence Solution: Solution Enables Customers to Detect Fraud in Real-Time and Comply with USA Patriot Act and Other Regulations." LexisNexis Press Release, Oct. 16, 2006, 27 pages.

* cited by examiner

*Primary Examiner* — Eric T. Wong
*Assistant Examiner* — John Anderson
(74) *Attorney, Agent, or Firm* — Perkins Coie LLP

(57) ABSTRACT

Methods and systems are disclosed for automatically identifying and managing potentially fraudulent transactions without adversely impacting legitimate customers. In one implementation, the methods and systems provide a transaction risk analyzer for analyzing a risk associated with a financial transaction. The transaction risk analyzer quickly and automatically evaluates a number of factors in connection with each transaction to determine the risk associated with the transaction. The factors may include, for example, the relationship of the customer to the financial services company, the identity of the customer, and the behavior pattern of the customer. A set of business rules may then be applied to these factors to help distinguish between potentially fraudulent transactions and legitimate transactions. Based on the business rules, the transaction risk analyzer may recommend certain actions to mitigate loss potentially resulting from the transaction. Such an arrangement helps lower the risk of fraudulent activity without penalizing legitimate customers.

20 Claims, 5 Drawing Sheets

TRANSACTION RISK ANALYZER

CROSS-REFERENCE TO RELATED APPLICATIONS

This application is a continuation and claims the benefit of U.S. patent application Ser. No. 11/924,550, filed Oct. 25, 2007, now U.S. Pat. No. 8,185,457, the entire disclosure of which is herein incorporated by reference for all purposes.

This application is related in subject matter to, and incorporates herein by reference in its entirety, each of the following: U.S. patent application Ser. No. 11/924,543 entitled "Transaction Risk Analyzer," filed Oct. 25, 2007; and U.S. patent application Ser. No. 11/924,546 entitled "Transaction Risk Analyzer," also filed Oct. 25, 2007.

TECHNICAL FIELD

The disclosed embodiments relate generally to various types of financial transactions and, more specifically, to systems and methods for analyzing risks associated with the transactions.

BACKGROUND

Financial services companies, such as banks, credit card companies, investment companies, and the like, handle numerous types of financial transactions on a daily basis. In a single day, for example, a bank may handle deposits, withdrawals, debit card payments, credit card payments, funds transfers, bill payments and many other types of financial transactions. These transactions may take place through various forms, including checks, wire transfers, electronic funds transfers, automated teller machines (ATM), and the like, and they may involve sums ranging anywhere from a few dollars to several hundred thousands of dollars and more. Furthermore, they may originate from virtually any country and any location by virtue of an extensive financial network that typically includes the Internet. Such transactions make it possible and convenient for consumers and businesses alike to exchange goods, services, and to conduct various commercial activities.

Most financial transactions are legitimate transactions carried out for genuine business or personal reasons. However, a small (but growing) number of transactions are conducted with the intent to defraud the financial services companies that handle the transactions. These fraudulent transactions work by taking advantage of the delay between the time a deposit is made and the time the funds are actually received in an account, which may take several days. Funds that are deposited via electronic funds transfers, for example, must first clear an automated clearing house (ACH) before they are actually received in the account, which may take up to two days. Checks may similarly take several days before the underlying funds are actually available to the financial services company.

Despite the long clearing time, certain customer-oriented financial services companies allow their customers to access the funds immediately rather than make the customers wait for the funds to clear. While this courtesy is convenient from the customers' perspective, for the financial services companies, it is equivalent to extending an unsecured loan for several days in the amount that was transferred. Unfortunately, unscrupulous parties may try to take advantage of the unsecured loan to defraud the financial services companies. These fraudulent activities impose an enormous cost on the financial services companies that, unfortunately, is ultimately passed on to consumers.

In a typical fraudulent transaction, an unknown party opens a new account with the financial services company and makes several small, but legitimate deposits, all of which clear in due course. Shortly thereafter, the party makes a much larger, but fraudulent deposit into the account, and begins almost immediately to withdraw all or a portion of the deposited amount. The unwary financial services company, not suspecting that a fraudulent transaction is taking place, allows the party to withdraw the funds before the deposit has cleared. Several days later when the financial services company realizes that a fraud has been perpetrated (because the deposit does not clear), the perpetrator and stolen funds are nowhere to be found.

One way to prevent the above fraudulent activity is to employ a fraud prevention team to scrutinize each transaction. Unfortunately, there are far too many transactions on a given day for any fraud prevention team to effectively monitor. Thus, most financial services companies address the above fraudulent activity by automatically denying customers access to all incoming funds until after the deposits have cleared. However, such a solution also penalizes legitimate customers who have no connection to any fraudulent activity. The vast majority of these customers are loyal, long-time customers whose transactions are sufficiently numerous and/or have occurred over a sufficiently long period of time as to pose little or no risk to the financial services company. Indiscriminately blocking these legitimate customers unfairly and adversely impacts their business and/or personal activities. Other solutions that purportedly prevent fraudulent activity similarly fail to take into account mitigating factors with respect to legitimate customers.

Accordingly, what is needed is a more effective way for financial services companies to prevent fraudulent transactions. More specifically, what is needed is a way for financial services companies to automatically identify and manage potentially fraudulent transactions without adversely impacting legitimate customers.

SUMMARY

The disclosed embodiments are directed to methods and systems for allowing a financial services company to automatically identify and manage potentially fraudulent transactions without adversely impacting legitimate customers. In one implementation, the methods and systems provide a transaction risk analyzer for analyzing a risk associated with a financial transaction. The transaction risk analyzer quickly and automatically evaluates a number of factors in connection with each transaction to determine the risk associated with the transaction. The factors may include, for example, the relationship of the customer to the financial services company, the network identity of the customer, and the behavior pattern of the customer. A set of business rules may then be applied to these factors to help distinguish between potentially fraudulent transactions and legitimate transactions. Based on the business rules, the transaction risk analyzer may recommend certain actions to mitigate loss potentially resulting from the transaction. Such an arrangement helps lower the risk of fraudulent activity without penalizing legitimate customers.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
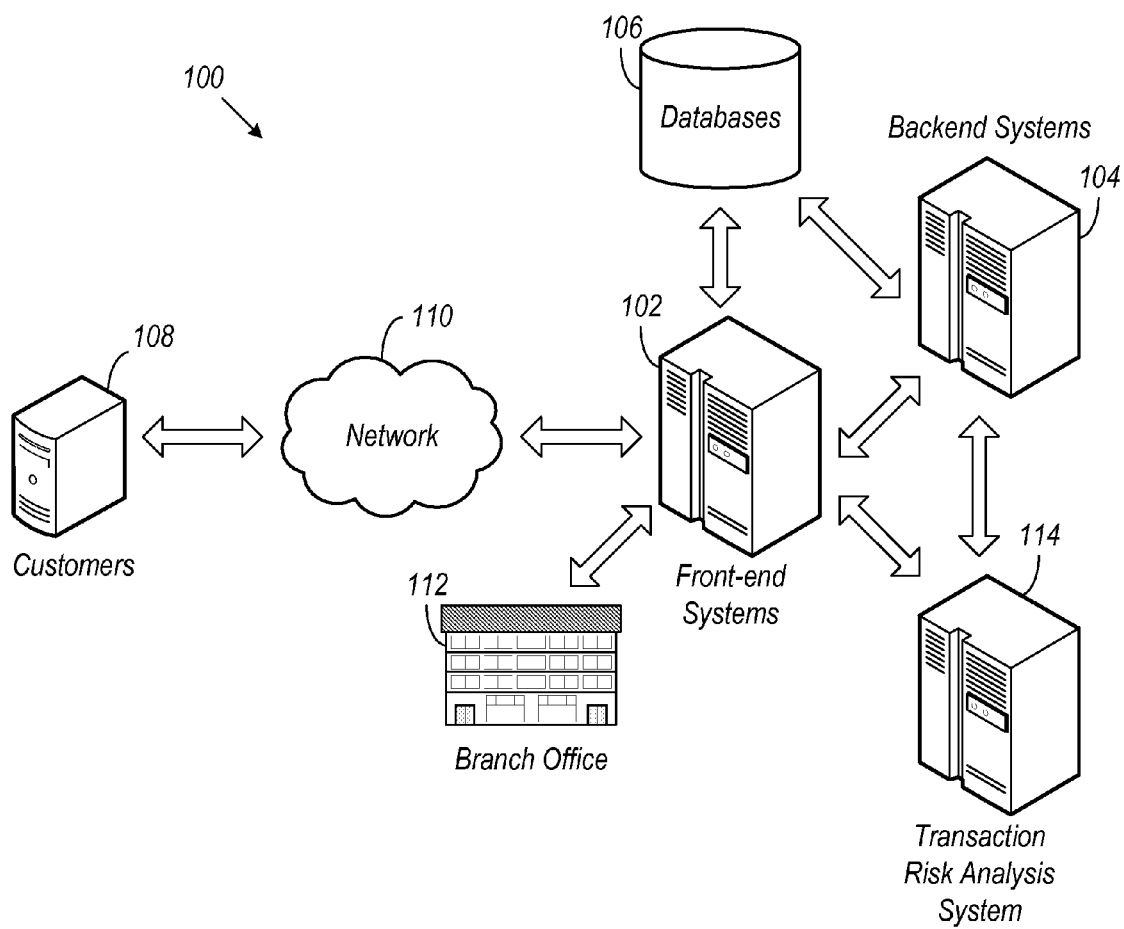
FIG. 1 illustrates an exemplary infrastructure for conducting financial transactions according to the disclosed

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, an exemplary infrastructure 100 of a financial services company is shown for conducting financial transactions according to the disclosed embodiments. The exemplary infrastructure 100 is typical of infrastructures found in many financial services companies; that is, it has numerous computing systems supporting various types of financial services applications. In the example shown here, the infrastructure 100 may include transaction risk analysis system 114, backend systems 104, and databases 106, all interconnected as shown. These various front-end and backend systems 102 and 104 and databases 106 are generally well known to those having ordinary skill in the art and will therefore be described only briefly here.

In general, the front-end systems 102 may include one or more Web servers and/or business application servers for allowing a customer 108 to conduct financial transactions online from a remote location over a network 110, such as the Internet. These front-end systems 102 are typically tasked with handling numerous types of online financial transactions, including online deposits and withdrawals, debit card payments, credit card payments, funds transfers, bill payments, and other types of financial transactions. Note that online transactions may also include transactions conducted by a customer service representative of the financial services company on behalf of the customer. In addition to online financial transactions, the front-end systems 102 may also handle off-line or physical transactions, such as deposits, withdrawals, and the like that take place at a local branch office 112 of the financial services company.

Once received, the online and off-line transactions are passed by the front-end systems 102 to the backend systems 104 and databases 106 for processing. The backend systems 104 may include, for example, a funds transfer system, a credit card processing system, an investment processing system, and the like. Examples of the databases 106 may include customer databases, account databases, transaction history databases, rules repositories, online session databases, and the like. The backend systems 104 and databases 106 typically process the transactions by updating account records, submitting the transactions to the appropriate third-party processing agency (e.g., automated clearinghouse (ACH)), and performing various other functions known to those having ordinary skill in the art to complete the transactions.

In accordance with the disclosed embodiments, the infrastructure 100 may include a transaction risk analysis system 114 connected to the front-end systems 102, backend systems 104, and databases 106. The transaction risk analysis system 114 may then leverage information from the front-end systems 102, backend systems 104, and databases 106 to analyze a risk associated with each transaction. For example, the transaction risk analysis system 114 may use information about the customer, the transaction itself, any associated accounts, prior transactional history, and the like, to determine the likelihood that the transaction is fraudulent. If the transaction is an online transaction, the transaction risk analysis system 114 may also use technical information pertaining to the online session to analyze the risk associated with the transaction. Such an arrangement provides a flexible way for the financial services company to automatically perform risk analysis of transactions conducted through the front-end systems 102, backend systems 104, and databases 106. As a result, the financial services company is capable of quickly were acting to potential fraudulent activities while allowing normal business operations to proceed for the majority of customers.

Based on the type of risk found, the transaction risk analysis system 114 may suggest certain actions to be taken to minimize any loss that may potentially result from the transactions. These actions may include, for example, delaying the transfer of funds for a particular transfer, restricting use of an account, denying access to a particular business application, setting a maximum withdraw amount or funds transfer limit, or other alterations to the normal operation of the business applications. Selection of the particular action to be recommended for a given transaction may be determined by one or more business rules defined by the financial services company. The transaction risk analysis system 114 allows authorized company personnel to add to, delete from, and/or modify the business rules "on the fly" as needed based on analysis of current and historical fraud activity and customer business behavior.

Figure 2:
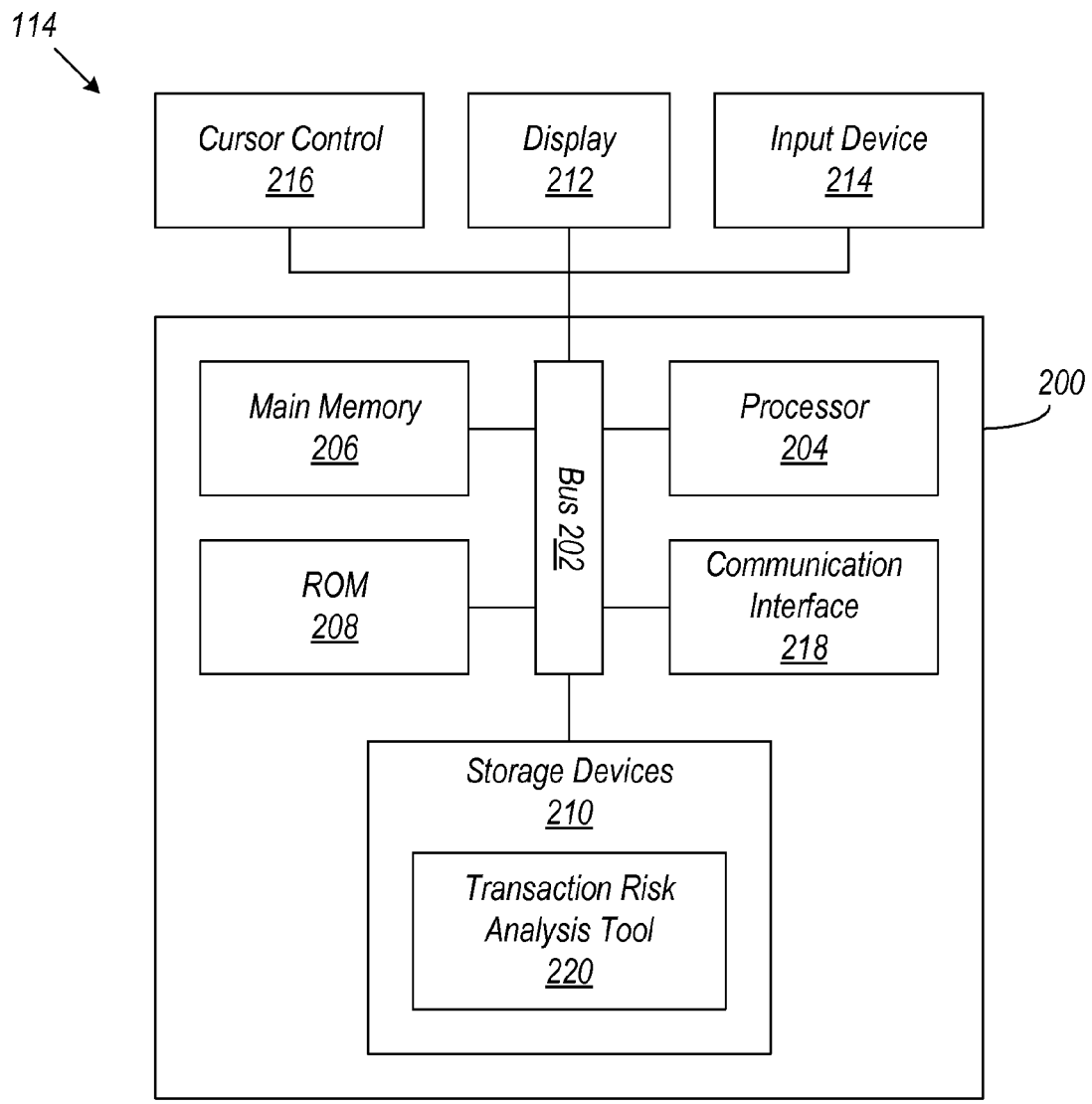
FIG. 2 illustrates an exemplary system for analyzing fraudulent transaction risks according to the disclosed embodiments.

FIG. 2 illustrates an example of the transaction risk analysis system 114 according to the disclosed embodiments. As can be seen, in some embodiments, the transaction risk analysis system 114 may be composed of a computer system 200. Any suitable computer system 200 known to those having ordinary skill in the art may be used as the transaction risk analysis system 114, including a personal computer, server, workstation, mainframe, and the like. Furthermore, although a single computer system is shown in FIG. 2, those having ordinary skill in the art will understand that the transaction risk analysis system 114 may include multiple computer systems working in conjunction with one another.

The computer system 200 typically includes a bus 202 or other communication mechanism for communicating information and a processor 204 coupled with the bus 202 for processing information. The computer system 200 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computer system 200 may further include a read-only memory (ROM) 208 or other static storage device coupled to the bus 202 for storing static information and instructions for the processor 204. A computer-readable storage device 210, such as a magnetic, optical, or solid state device, may be coupled to the bus 202 for storing information and instructions for the processor 204.

The computer system 200 may be coupled via the bus 202 to a display 212, such as a cathode ray tube (CRT) or liquid crystal display (LCD), for displaying information to a customer. An input device 214, including, for example, alphanumeric and other keys, may be coupled to the bus 202 for communicating information and command selections to the processor 204. Another type of customer input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the computer system 200 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The computer system 200 may also include a communication interface 218 coupled to the bus 202. The communication interface 218 typically provides a two way data communication coupling between the computer system 200 and the network 110. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, a transaction risk analysis tool 220, or more precisely, the computer-readable instructions therefor, may reside on the storage device 210. The transaction risk analysis tool 220 may then be executed to automatically identify and deter potentially fraudulent transactions while allowing other, legitimate transactions to proceed. The potentially fraudulent transactions may be identified based on more and more criteria that may be quickly changed as needed without having to make major modifications to existing systems and/or shutting down businesses. In addition, the transaction risk analysis tool 220 may be scaled as needed according to the size of the financial services company, and is independent in that it can be easily ported to any financial services infrastructure.

Figure 3:
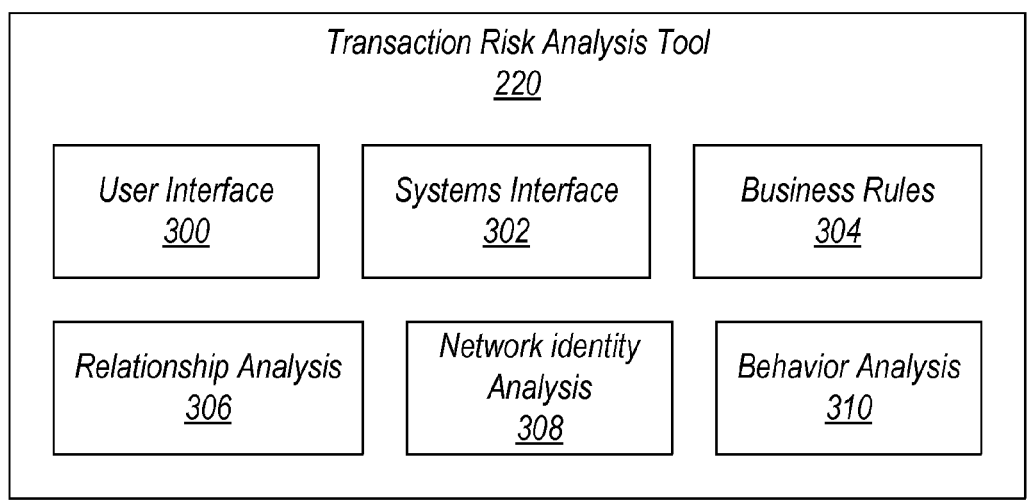
FIG. 3 illustrates an exemplary tool for analyzing fraudulent transaction risks according to the disclosed embodiments.

Referring now to FIG. 3, in one embodiment, the transaction risk analysis tool 220 may comprise a number of functional components, including a user interface module 300, a systems interface module 302, and a business rules module 302. In addition, the transaction risk analysis tool 220 may further comprise a relationship analysis module 306, a network identity analysis module 308, and a behavior analysis module 310. Other functional components may also be added to or removed from the transaction risk analysis tool 220 without departing from the scope of the disclosed embodiments. Note that although the various functional components 300-310 of the transaction risk analysis tool 220 have been shown as discrete units in FIG. 3, those having ordinary skill in the art will understand that two or more of these components may be combined into a single component, and that any individual component may be divided into several constituent components, without departing from the scope of the disclosed embodiments.

In general, the user interface module 300 is responsible for allowing a user to interact with the various functional components of the transaction risk analysis tool 220 as needed. To this end, the user interface module 300 may provide a graphical user interface for displaying information to the user and for receiving input from the user. Such input may include, for example, any manual commands, control signals, modifications and adjustments that a user may wish to make to the transaction risk analysis tool 220. This allows the user to dynamically adjust operation of the transaction risk analysis tool 220 as needed to accommodate for changes in the types of transactions being conducted and/or changes in the business environment. Any graphical user interface suitable to those having ordinary skill in the art may be used, as the particular design and layout of the graphical user interface is not overly important to the practice of the disclosed embodiments.

The systems interface module 302 may function to provide an interface between the transaction risk analysis tool 220 and the various front-end systems 102, backend systems 104, and databases 106. To this end, the systems interface module 302 may implement any communication protocols necessary to allow the transaction risk analysis tool 220 to communicate with the front-end systems 102, backend systems 104, and databases 106. Such protocols may include, for example, Hypertext Transfer Protocol (HTTP), File Transfer Protocol (FTP), Telnet, and any other suitable communication protocol known to those having ordinary skill in the art. In addition, the systems interface module 302 may function to implement any data format required for data to be exchanged with the front-end systems 102, backend systems 104, and databases 106. The systems interface module 202 may also function to allow the transaction risk analysis tool 220 to communicate with any third-party applications and systems that are external to the financial services company, such as third-party network monitoring services, and the like.

The business rules module 304 may function to enforce various business rules that have been implemented by the financial services company. These rules are typically stored in a rules repository (not expressly shown) and govern different aspects of the financial transactions handled by the financial services company. Examples of aspects that may be covered by the business rules include whether to allow immediate access to recently deposited funds, what portion of the deposited funds may be accessible, length of time to hold the funds, maximum withdrawal and/or deposit amounts, and the like.

The particular rules that are triggered by a given financial transaction may depend on a number of factors about the transaction, such as the relationship of the customer to the financial services company, the network identity of the person wishing to conduct the transaction, the behavior pattern of the customer, and the like.

In some embodiments, determining the relationship of the customer to the financial services company may be performed by the relationship analysis module 306. In general, the relationship analysis module 306 may perform this function by accessing the databases 106 to gather data about the customer. Such data may include, for example, the number of years the customer has had a product with the financial services company, the number of products the customer has with the financial services company, the types of products (e.g., savings account, checking account, investment account, etc.) the customer has with the financial services company, the net value of the products that the customer has with the financial services company, and any other data that would provide information about the nature and type of relationship that the customer has with the financial services company. Thus, an account that is only a few days old and is the only account the customer has with the financial services company may be example of an account that the relationship analysis module 306 is designed to detect.

The network identity analysis module 308 may function to determine whether the person attempting to conduct an online transaction is a legitimate customer. This issue often arises in the context of network identity theft, where someone impersonating an account owner or cardholder attempts to transfer funds or withdraw funds from a legitimate account. The issue may also arise in the context of illegitimate accounts, for example, where an account owner or cardholder who purports to reside in one location is actually located in another location, such as a country that is a known haven for perpetrators of fraudulent transactions. The network identity analysis module 308 may attempt to identify these legitimate customers by gathering data about the online session from the front-end servers 102, the backend servers 104, and/or the databases 106, like the IP address, the type of Web browser, the time of the current online session and/or the previous online session, and so forth. Thus, for example, a customer who conducts a transaction from an IP address located in Houston, Tex., and five minutes later attempts to conduct another transaction from an IP address located in Eastern Europe, may be an example of a customer that the network identity analysis module 308 may be designed to detect.

Finally, the behavior analysis module 310 may function to determine whether a customer's behavior may indicate a potentially fraudulent transaction. To this end, the behavior analysis module 310 obtains data from the front-end servers 102, the backend servers 104, and/or the databases 106 to detect any unusual behavior by the customer. Such data may include, for example, the transaction history of the customer, the transaction pattern of the customer, any variances or deviations from his/her own patterns as well as the transaction patterns of other customers, and the like. Thus, a customer making a deposit in the several thousand dollar range when the customer has historically deposited much smaller amounts may be an example of a behavior that the behavior analysis module 310 may be designed to detect.

Figure 4:
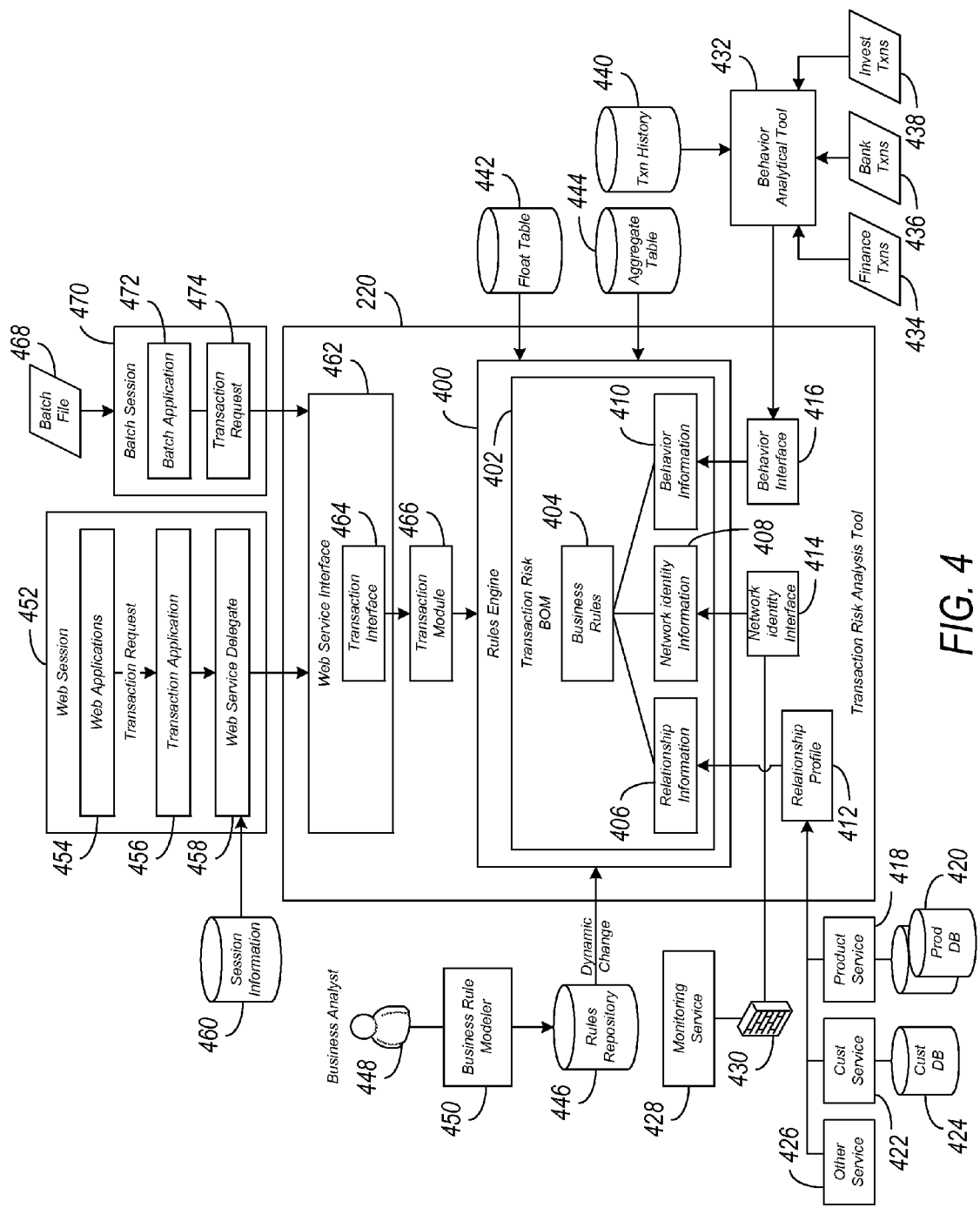
FIG. 4 illustrates an exemplary implementation of the tool for analyzing fraudulent transaction risks according to the disclosed embodiments.

FIG. 4 illustrates a specific implementation of the transaction risk analysis tool 220 of FIG. 3 according to the disclosed embodiments. In addition to the transaction risk analysis tool 220, FIG. 4 also illustrates various other functional components that may be used in conjunction with the transaction risk analysis tool 220, most of which are standard components that are well known to those having ordinary skill in the art and are therefore not described in detail herein. It should be noted, however, that the implementation shown in FIG. 4 is exemplary only, and that other implementations of the transaction risk analysis tool 220 may be developed by those having ordinary skill in the art without departing from the scope of the disclosed embodiments.

In the implementation of FIG. 4, the transaction risk analysis tool 220 may comprise a rules engine 400 for enforcing the business rules of the financial services company. The rules engine 400 may include a transaction risk business object model (BOM) 402 that may define the information used by the rules engine 400. The information may include, among other things, one or more business rules 404 for governing the various types of transactions handled by the financial services company. These transactions may include, for example, deposits, withdrawals, debit card payments, credit card payments, funds transfers, bill payments, and other types of financial transactions known to those having ordinary skill in the art. Such transactions may take place in a variety of forms, including checks (online and physical), wire transfers, electronic funds transfers, automated teller machines (ATM), and the like, and they may originate from virtually any location throughout the world. In addition to financial transactions, other types of transactions may also be governed by the business rules 404, including opening an account, closing an account, changing personal information for an account (e.g., name, address, password, etc.), and the like.

The transaction risk business object model 402 may also define the type of information needed for proper operation of the business rules 404. In accordance with the disclosed embodiments, such information may include, among other things, customer relationship information 406, customer network identity information 408, and customer behavior information 410. A relationship profile 412 may provide the customer relationship information 406, a standard network identity interface 414 may be used to obtain the customer network identity information 408, and a standard behavior interface 416 may be used to obtain the customer behavior information 410. Such customer relationship information 406, customer network identity information 408, and customer behavior information 410 may then be processed through the business rules 404 to automatically identify and manage potentially fraudulent transactions.

The customer relationship information 406, as alluded to in FIG. 3, may include the number of years the customer has had a product with the financial services company, the number of products the customer has with the financial services company, the types of products (e.g., savings account, checking account, investment account, etc.) the customer has with the financial services company, the net value of the products that the customer has with the financial services company, and the like. This relationship information 406 may be obtained by extracting one or more items of personal information about the customer, such as the customer's name, address, account number, and other similar information. Such personal information may be obtained, for example, when the customer logs on to conduct an online transaction. The information may also be obtained via a customer service representative of the financial services company conducting the transaction on behalf of the customer, either online or at a physical branch of the financial services company.

Once the personal information about the customer has been obtained, it may be used to access various standard service systems and databases of the financial services company to construct the relationship profile 412 for the customer. Examples of service systems and databases that may be accessed to derive information for the customer may include product systems 418, product databases 420, customer systems 422, customer databases, 424, as well as other products and services 426 known to those having ordinary skill in the art. The relationship profile 412 may then be used to provide the relationship information 406 to the rules engine 400.

The customer network identity information 408, as explained with respect to FIG. 3, may include information such as the IP address, the type of Web browser, the time of the current online session and/or the previous online session, and so forth. In some embodiments, such network identity information may be obtained from a third-party transaction monitoring service 428 that specializes in monetary financial transactions on behalf of the financial services company. Such a transaction monitoring service 428 may be, for example, the RSA® Transaction Monitoring service available from EMC Corp. of Hopkinton, Mass. The transaction monitoring service 428 is preferably capable of evaluating each online transaction that passes through a firewall 430 of the financial services company to determine, for example, the IP address, the type of Web browser, the time of the current online session and/or the previous online session, and so forth. The standard network identity interface 414 allows this information to thereafter be passed to the rules engine 400.

As for the customer behavior information 410, this information may include the transaction history of the customer, the transaction pattern of the customer, any variances or deviations from his/her own patterns as well as the transaction patterns of other customers, and the like. In some embodiments, such customer behavior information 410 may be provided by a third-party suspicious activity monitoring (SAM) tool 432, such as STB-Detector from Lombard Risk International (USA), Inc. of New York, N.Y. Such a suspicious activity monitoring tool 432 typically monitors the customer's behavior against his/her own history, looking for unusual or suspicious activity relative to his/her own behavior. The suspicious activity monitoring tool 432 may also monitor the customer's behavior against other customers, usually those within his/her transactional peer group (i.e., those who conduct transactions having roughly the same dollar amount and/or frequency). To this end, the suspicious activity monitoring tool 432 may access, for example, one or more of the customers financial transactions 434, bank transactions 436, investment transactions 438, as well as the customers transaction history 440. The standard behavior interface 416 allows this information to thereafter be provided to the rules engine 400.

In some embodiments, where applicable, information from a float table 442 as well as an aggregate table 444 may also be provided to the rules engine 400. The float table 442 typically contains information regarding the float amounts that a financial services company, such as a bank, has extended to its customer on a given day. Such a float table 442 is typically checked on a regular basis to ensure that the financial services company has reserved sufficient funds to meet its float obligations. The aggregate table 444 typically contains an aggregation of the various transactions and/or the dollar amounts transacted by customers over a period of time and may be useful as an indicator of the legitimacy or trustworthiness of a particular customer.

As for the business rules 404 themselves, these rules may be provided to the rules engine 400 from a rules repository 446. Such a rules repository 446 may be implemented using, for example, an iLog rules repository available from iLog, Inc. of Sunnyvale, Calif. A business analyst 448 of the financial services company may generate the business rules 444 using a business rule modeler, such as the iLog business rule modeler. Table 1 below illustrates an exemplary set of business rules that may be used to automatically identify and manage potentially fraudulent transactions. Note that the exemplary business rules in Table 1 are defined specifically for deposits. Similar business rules may be derived by those having ordinary skill in the art to govern other types of transactions, such as debit card payments, credit card payments, funds transfers, bill payments and other types of financial transactions.

XXX may be held until the next day if the check is drawn on the financial services company itself, for 2 business days if drawn on a different, but local financial services company, and 5 days if drawn on a different and non-local financial services company. If the deposit was made electronically, the amount immediately accessible and the hold time may be $X,XXX and X business days, respectively.

Risk Level 3 may be essentially the same as Risk Level 2 in some embodiments because, although the IP address and

TABLE 1

| Risk Level | Criteria | Manual (Deposit Available) | Manual (Deposit Hold Time) | Electronic (Deposit Available) | Electronic (Deposit Hold Time) |
|---|---|---|---|---|---|
| 5 | Account has: Coded as fraud Excessive chargebacks Delinquent designation Foreign IP address Behavior inconsistent w/ self and peers | $XXX | Bank - Next Day Local - 2 Days Non Local - 5 Days | $X | X Days |
| 4 | One or none of the following: Acct Active or Creditworthy Account open ≥ X months X or more Products U.S. IP Address Behavior consistent w/ peers | $X,XXX | Bank - Next Days Local - 2 Days Non-Local - 5 Days | $XX | X Days |
| 3 | Any two of the following: Acent Active or Creditworthy Account open ≥ XX months X or more Products Regional IP address Behavior consistent w/ self | $XX,XXX | Bank - Next Day Local - 2 Days Non Local - 5 Days | $X,XXX | X Days |
| 2 | All of the following criteria: Acct Active or Creditworthy Account open ≥ XX months X or more Products Local IP address Behavior consistent w/ self and peers | $XX,XXX | Bank - Next Day Local - 2 Days Non-Local - 5 Days | $X,XXX | X Days |
| 1 | Elite status OR exception granted by executive manager | Unlimited | No Hold | $XX,XXX | X Days |

As can be seen, the exemplary business rules in Table 1 have been divided into five levels of risk. The first level, Risk Level 1, means that there is essentially no likelihood of fraudulent activity because the customer has either acquired "Elite" or other special status based on some predefined criteria, or an executive manager has vouched for the customer by granting a special exception. In that case, there is no "hold" or other recommended action placed on any amount the customer may wish to deposit manually via a check. For electronic deposits, the customer may be given immediate access, for example, up to $XX,XXX of the deposit, with any remainder placed on hold for at least X business days to ensure the deposit clears the appropriate clearing agency.

With increasing risk, however, more restrictive actions are recommended for each risk level. For example, Risk Level 2 means that the customer has an active or creditworthy account, the account has been opened for at least XX months, the customer has at least X number of products with the financial services company, the customer has a local IP address, and the customer's behavior is consistent his own historical behavior pattern as well as the behavior patterns of his transactional peers. At this risk level, the likelihood of fraudulent activity is relatively low and, therefore, the customer may be given immediate access to his/her deposit up to $XX,XXX if the deposit was made manually via a check (either online or physically). Any amount in excess of $XX, behavior pattern are different from those in Risk Level 2, and the number of criteria required to be present are lower than in Risk Level 2, it has been determined that transactions that fall into this category still pose relatively low likelihood of fraudulent activity.

Transactions that fall into Risk Level 4, however, may warrant more restrictive recommended actions, as the number of criteria required to be present, the customer's relationship with the financial services company, the customer's network identity, and/or the customer's behavior indicate a greater likelihood of fraudulent activity.

Finally, transactions that fall into Risk Level 5 may warrant the most restrictive recommended actions out of the various risk levels because the number of criteria required to be present, the customer's relationship with the financial services company, the customer's network identity, and/or the customer's behavior all indicate the greatest likelihood of fraudulent activity.

Note that for electronic deposits, the hold time is substantially the same for all risk levels because it takes substantially the same number of days for the deposits to clear at the appropriate transaction clearing agency regardless of the risk level.

In some embodiments, more weight may be given to certain ones of the criteria as needed, for example, if it is observed over time that certain criteria are more likely to result in fraudulent activity than others. Such weight distribution for the various criteria may then be modified by an authorized user in real time as needed, for example, to adapt to changes in tactics by perpetrators of fraud and other criminal activity. The changes may be made, for example, using the graphical user interface of the user interface module 300 (see FIG. 3) to modify the business rules in the business rules repository 446, which business rules may then be released to the transaction risk analysis tool 220. This allows the changes to be made without having to take the tool 220 offline and/or shut down the front-end systems 102 or backend systems 104.

Indeed, in some embodiments, an entire criterion may be removed from, added to, or otherwise changed by an authorized user in real time as needed. For example, if technology became available that enabled an unscrupulous party to perfectly mimic another person's legitimate IP address, then the IP address criteria may no longer have much value in detecting fraudulent activity and may therefore be discarded or otherwise replaced with another criterion. Similarly, recommended actions associated with the various criteria may also be removed, added, or otherwise changed as needed. Such an arrangement gives the financial services company the flexibility and agility to adjust to varying conditions as dictated by changes in the business, technical, and/or regulatory environment.

In operation, when a customer wishes to conduct a financial transaction (or an administrative transaction), he/she may log on to a Web page of the financial services company. At that time, the front-end servers 102 (see FIG. 1) of the financial services company may initiate a standard Web session 452 for the customer. Standard Web applications 454 may then be displayed to the customers, including Web applications that allow the customers to select from one or more standard transactions. The transactions may include, for example, a check deposit transaction, a bill payment transaction, a funds transfer transaction, a credit or debit card payment transaction, and the like. The customer may then select one of the transactions, at which time the Web application 454 may send a transaction request to an appropriate transaction application 456. The standard transaction application 456 may thereafter obtain the necessary information from the customer to conduct the transaction and provide the information to a standard Web service delegate 458 of the transaction risk analysis tool 220. Typical session information 460, such as the customer's name, the customer's user ID, logon date and time, and the like, may also be provided to the Web services delegate 458 of the transaction risk analysis tool 220 at this time.

The Web services delegate 458 passes the transaction, or more precisely, the information regarding the transaction, including the session information 460, to a standard Web service interface 462 of the transaction risk analysis tool 220. A standard transaction interface 464 within the Web service interface 462 receives the information and sends it to a standard transaction module 466 of the transaction risk analysis tool 220. From the transaction module 466, the transaction is passed to the rules engine 400. Thereafter, relationship information 406, network identity information 408, and behavior information 410 may be acquired for the transaction in accordance with the disclosed embodiments. The rules engine 400 may then apply the business rules 404 to the relationship information 406, network identity information 408, and behavior information 410 to identify and manage any potentially fraudulent activity.

In some embodiments, instead of the customer conducting an online transaction personally, a customer service representative of the financial services company may conduct the transaction on behalf of the customer, for example, where the customer is telephoning in the transaction or is physically conducting the transaction at a local branch of the financial services company. In that case, operation of the transaction risk analysis tool 220 may be essentially the same as described above except that the Web session 452 may be initiated for the customer service representative, but using on the customer's information.

In some embodiments, a string of transactions may be conducted may be conducted consecutively via a batch file 468, as in the case of an automated teller machine (ATM). In that case, operation of the transaction risk analysis tool 220 may be essentially the same as described above except that instead of a Web session 452, the front-end systems 102 may initiate a standard batch session 470 that provides a standard batch application 472 for making a standard batch transaction request 474.

Figure 5:
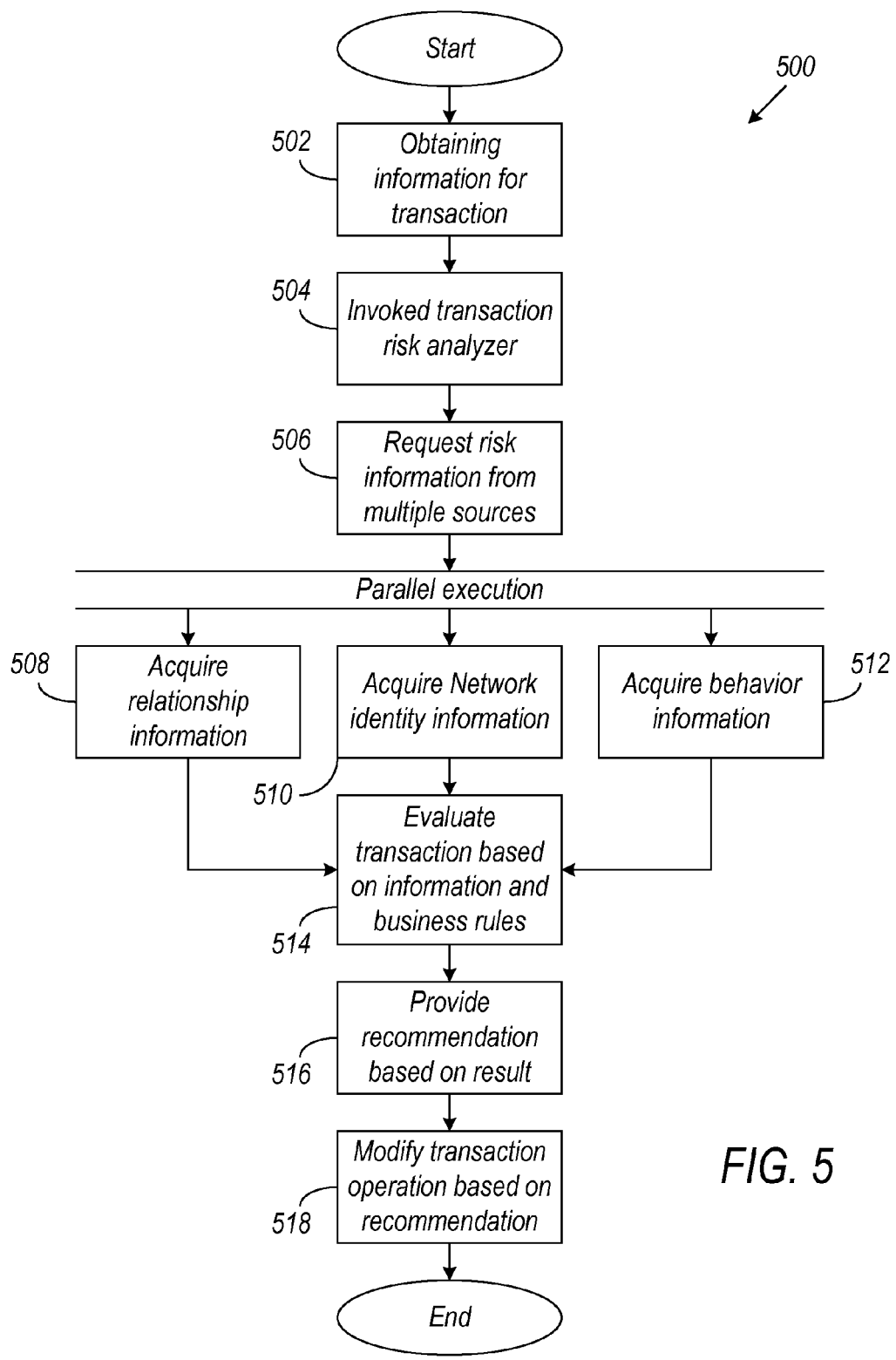
FIG. 5 illustrates an exemplary method of analyzing fraudulent transaction risks according to the disclosed embodiments.

Thus far, specific embodiments have been disclosed for automatically identifying and managing potentially fraudulent transactions. Referring now to FIG. 5, general guidelines are shown in the form of a method that may be used to implement the various embodiments disclosed above. As can be seen in FIG. 5, a method 500 of identifying and managing potentially fraudulent transactions may begin at block 502, where information about the transaction is obtained. At block 504, a transaction risk analyzer is invoked to analyze, and at block 506, risk information is requested for the transaction from various sources for the transaction. Such risk information may include, for example, relationship information, network identity information, and behavior information. In some embodiments, the relationship information, network identity information, and behavior information may be acquired in parallel at block 508, 510, and 512, respectively. It is also possible, however, to acquire the relationship information, network identity information, and behavior information serially or sequentially as needed.

Once the information is acquired, a predefined set of business rules is applied to the information in order to determine whether the transaction poses a risk of fraudulent activity at block 514. At block 516, one or more recommended actions may be implemented based on whether the transaction poses a risk of fraudulent activity. Such recommended actions may include, for example, limiting the amount of funds that are available to the customer for a predetermined amount of time, limiting the types of transactions that are available to the customer for a predetermined amount of time (e.g., no electronic funds transfer), and the like. The severity or restrictiveness of the recommended actions may depend on the likelihood that the transaction is a fraudulent transaction. At block 518, the recommended actions may be implemented to modify the other was normal operation of the transaction. Such an arrangement helps lower the risk of fraudulent activity to the financial services company without indiscriminately penalizing legitimate customers.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for implementing business rules for a financial services company, the system comprising:
   one or more processors; and
   computer-readable code that programs the one or more processors to:

define a plurality of business rules for a type of transaction offered by the financial services company, the business rules being distinguishable from one another;

assign transaction criteria to each business rule, the transaction criteria for at least one business rule being more stringent than the transaction criteria for at least one other business rule;

associate a fraud risk level with each business rule such that business rules with more stringent transaction criteria have a lower fraud risk level than business rules with less stringent transaction criteria;

wherein the transaction criteria relate to a relationship of a customer with the financial services company, a network identity of the customer, and a behavior of the customer, receive a transaction request of the type of transaction offered by the financial services company from a customer;

determine the transaction criteria of the transaction request, wherein determining the transaction criteria of the transaction request comprises:

collecting network identity information to determine the network identity of the customer, wherein the network identity information comprises an IP address and a type of web browser; and analyzing the behavior of the customer, wherein analyzing the behavior of the customer comprises comparing the customer's behavior with the behavior of other customer's in a transactional peer group of the customer;

apply each business rule to the transaction criteria of the transaction request to determine a fraud risk level of the transaction request; and implement at least one recommended action based on the fraud risk level of the transaction request.

2. The system of claim 1, wherein the computer-readable code that programs the one or more processors further programs the one or more processors to assign a restriction to each business rule, the restriction having a level of restrictiveness corresponding to a stringency of the transaction criteria for that business rule.

3. The system of claim 1, wherein the computer-readable code that programs the one or more processors further programs the one or more processors to modify the type of transaction to comply with the restriction of the given business rule if the set of criteria for the business rule is satisfied.

4. The system of claim 1, wherein the computer-readable code that programs the one or more processors further programs the one or more processors to dynamically modify one or more transaction criteria for a given business rule based on changes in a business environment of the financial services company.

5. The system of claim 1, wherein the computer-readable code that programs the one or more processors further programs the one or more processors to assign more weight to a selected criterion of a given business rule based on a likelihood of that the criterion, if satisfied, will result in a fraudulent transaction.

6. The system of claim 1, wherein the transaction comprises one or more of: a deposit transaction, a withdrawal transaction, a debit card transaction, a credit card transaction, a funds transfer, a bill payment, and an investment transaction.

7. The system of claim 1, wherein a form of the transaction comprises one or more of: a check, a wire transfer, an electronic funds transfer, and an automated teller machine (ATM).

8. A method of implementing business rules for a financial services company, the method comprising:

defining, using a processor, a plurality of business rules for a type of transaction offered by the financial services company, the business rules being distinguishable from one another;

assigning, using the processor, transaction criteria to each business rule, the transaction criteria for at least one business rule being more stringent than the transaction criteria for at least one other business rule;

associating, using the processor, a fraud risk level with each business rule such that business rules with more stringent transaction criteria have a lower fraud risk level than business rules with less stringent transaction criteria;

wherein the transaction criteria relate to a relationship of a customer with the financial services company, a network identity of the customer, and a behavior of the customer, receiving a transaction request of the type of transaction offered by the financial services company from a customer;

determining the transaction criteria of the transaction request, wherein determining transaction criteria comprises:

collecting network identity information to determine the network identity of the customer, wherein the network identity information comprises an IP address and a type of web browser, and analyzing the behavior of the customer, wherein analyzing the behavior of the customer comprises comparing the customer's behavior with the behavior of other customer's in a transactional peer group of the customer;

applying, using the processor, each business rule to the transaction criteria of the transaction request to determine a fraud risk level of the transaction request; and implementing at least one recommended action based on the fraud risk level of the transaction request.

9. The method of claim 8, further comprising assigning a restriction to each business rule, the restriction having a level of restrictiveness corresponding to a stringency of the transaction criteria for that business rule.

10. The method of claim 9, further comprising modifying the type of transaction to comply with the restriction of the given business rule if the set of criteria for the business rule is satisfied.

11. The method of claim 8, further comprising dynamically modifying one or more transaction criteria for a given business rule based on changes in a business environment of the financial services company.

12. The method of claim 8, further comprising assigning more weight to a selected criterion of a given business rule based on a likelihood of that the criterion, if satisfied, will result in a fraudulent transaction.

13. The method of claim 8, wherein the transaction comprises one or more of: a deposit transaction, a withdrawal transaction, a debit card transaction, a credit card transaction, a funds transfer, a bill payment, and an investment transaction.

14. The method of claim 8, wherein a form of the transaction comprises one or more of: a check, a wire transfer, an electronic funds transfer, and an automated teller machine (ATM).

15. A non-transitory computer-readable medium encoded with computer-readable instructions for implementing business rules for a financial services company, the computer-readable instructions comprising instructions for causing a computer to:
- define a plurality of business rules for a type of transaction offered by the financial services company, the business rules being distinguishable from one another;
- assign transaction criteria to each business rule, the transaction criteria for at least one business rule being more stringent than the transaction criteria for at least one other business rule;
- associate a fraud risk level with each business rule such that business rules with more stringent transaction criteria have a lower fraud risk level than business rules with less stringent transaction criteria;
    - wherein the transaction criteria relate to a relationship of a customer with the financial services company, a network identity of the customer, and a behavior of the customer,
- receive a transaction request of the type of transaction offered by the financial services company from a customer;
- determine the transaction criteria of the transaction request, wherein determining transaction criteria comprises:
    - collecting network identity information to determine the network identity of the customer, wherein the network identity information comprises an IP address and a type of web browser, and
    - analyzing the behavior of the customer, wherein analyzing the behavior of the customer comprises comparing the customer's behavior with the behavior of other customer's in a transactional peer group of the customer;
- apply each business rule to the transaction criteria of the transaction request to determine a fraud risk level of the transaction request; and
- implement at least one recommended action based on the fraud risk level of the transaction request.

16. The non-transitory computer-readable medium of claim 15, further comprising instructions for causing a computer to assign a restriction to each business rule, the restriction having a level of restrictiveness corresponding to a stringency of the transaction criteria for that business rule.

17. The non-transitory computer-readable medium of claim 15, further comprising instructions for causing a computer to modify the type of transaction to comply with the restriction of the given business rule if the set of criteria for the business rule is satisfied.

18. The non-transitory computer-readable medium of claim 15, further comprising instructions for causing a computer to dynamically modify one or more transaction criteria for a given business rule based on changes in a business environment of the financial services company.

19. The non-transitory computer-readable medium of claim 15, further comprising instructions for causing a computer to assign more weight to a selected criterion of a given business rule based on a likelihood of that the criterion, if satisfied, will result in a fraudulent transaction.

20. The non-transitory computer-readable medium of claim 15, wherein the transaction comprises one or more of: a deposit transaction, a withdrawal transaction, a debit card transaction, a credit card transaction, a funds transfer, a bill payment, and an investment transaction.

* * * * *